United States Patent [19]
Morello et al.
[11] Patent Number: 4,896,024
[45] Date of Patent: Jan. 23, 1990

[54] APPARATUS FOR DISPENSING AND ACCEPTING RETURN OF REUSABLE ARTICLES

[75] Inventors: Herbert Morello; F. Michael Theriault, both of Canton; Michael H. Wellman, Canal Fulton, all of Ohio

[73] Assignee: Diebold, Incorporated, North Canton, Ohio

[21] Appl. No.: 110,014

[22] Filed: Oct. 19, 1987

[51] Int. Cl.[4] ........................................ G06K 5/00
[52] U.S. Cl. ............................ 235/381; 340/825.35; 194/210; 194/904; 414/274; 414/278
[58] Field of Search .................. 221/88, 218; 194/205, 194/904, 210, 212; 414/273, 274, 278, 280, 282; 235/381; 340/825.35

[56] References Cited

U.S. PATENT DOCUMENTS

| | | | |
|---|---|---|---|
| 3,964,577 | 6/1976 | Bengtsson | 186/37 |
| 4,251,177 | 2/1981 | Neuhaeusser et al. . | |
| 4,348,152 | 9/1982 | Takamatsu . | |
| 4,417,838 | 9/1983 | Shultz et al. . | |
| 4,563,120 | 1/1986 | Josserand . | |
| 4,668,150 | 5/1987 | Blumberg . | |
| 4,690,602 | 9/1987 | Castaldi et al. | 414/282 |
| 4,734,005 | 3/1988 | Blumberg | 414/273 |

FOREIGN PATENT DOCUMENTS

| | | | |
|---|---|---|---|
| 30515 | 1/1985 | Australia . | |
| 73629 | 12/1987 | Australia . | |
| 1207411 | 7/1986 | Canada . | |
| 0191636 | 8/1986 | European Pat. Off. . | |
| 0249367 | 12/1987 | European Pat. Off. | 194/205 |
| 2549624 | 1/1985 | France | 194/205 |
| 2563985 | 11/1985 | France | 194/205 |
| 49-38689 | 4/1974 | Japan . | |
| 56-09889 | 1/1981 | Japan . | |
| 56-29786 | 3/1981 | Japan . | |
| 1475748 | 6/1977 | United Kingdom . | |
| 86/02758 | 5/1986 | World Int. Prop. O. . | |
| 86/04173 | 7/1986 | World Int. Prop. O. . | |

*Primary Examiner*—William M. Shoop, Jr.
*Assistant Examiner*—H. L. Williams
*Attorney, Agent, or Firm*—D. Peter Hochberg; Mark Kusner; Louis J. Weisz

[57] ABSTRACT

An apparatus for dispensing and returning reusable articles each identifiable with its own identification code, comprising: a pair of opposing, stationary arrays of locations, each location being capable of holding a reusable article therein and having its own particular location code; a memory adapted to store details of the location codes and the article codes in memory; a data receiver for receiving informational data from a patron; a receptacle for receiving and discharging the articles; a transfer mechanism for placing an article in a location in the arrays or removing an article therefrom, the transfer mechanism being movable relative to the arrays between operative engagement with any of the locations and the receptacle; an article code sensing device adapted to sense the article code of an article carried by the transfer mechanism; and a control device having means for receiving control information and for generating output instructional information and control signals, the control device being responsive to informational data from the receiver to actuate the transfer mechanism to remove a selected article from a location in the arrays to the receptacle by the transfer mechanism, or to return an article received by the receptacle to an empty location in the arrays.

20 Claims, 11 Drawing Sheets

APPARATUS FOR DISPENSING AND ACCEPTING RETURN OF REUSABLE ARTICLES

FIELD OF THE INVENTION

The present invention relates to article handling devices and more particularly to a mechanism for dispensing reusable articles for a period of time after which they may be returned to the mechanism. The present invention is particularly applicable to a machine for renting and/or selling articles such as video cassettes, audio tapes, films or the like, and will be described with particular reference thereto. However, the invention has other broader applications such as for transferring articles from one position to another position in a planar array.

BACKGROUND OF THE INVENTION

With the ever increasing popularity of video cassettes for home viewing, it has become desirable to make such cassettes more easily available to the public in readily accessible areas. At the present time, most video cassette rentals or purchases are through rental clubs or stores which maintain large libraries of current and past video releases for rental or sale. Such business establishments require the leasing of building space together with employment of personnel to manage the daily business affairs thereof. To eliminate lease costs as well as personnel costs, it has been suggested that an alternative method of renting and selling cassettes is by means of video dispensing machines. Such machines are disclosed in U.S. Pat. Nos. 4,589,810 to Shore et al; 4,300,040 and 4,414,467 to Gould et al; and 4,458,802 to Maciver et al. The advantages of such machines are that they may be placed in areas of large public access, such as in shopping malls or apartment buildings, and they do not require large floor space or attendant personnel.

Of particular importance with respect to such video dispensing devices is the size, operation and reliability of the internal transport mechanisms which transfers the cassettes from storage to the patron and vice versa. In this respect, it is important that such mechanisms are completely reliable, in that on malfunction can incapacitate (disable) the machine which may discourage patrons from ever using such machines again. It is likewise important to minimize the size of the transport mechanism. Because of the limited space available in such machines, it is desirable to minimize the size of the transport mechanism to maximize the cassette storage area within the machines. Further, because of the limited storage space within such machines, to avoid depleting the machine's inventory of dispensable articles, it is also important to provide a machine wherein returned articles are immediately returned to the machine's usable inventory to be available for dispensing.

Suggestions to automate a previously manually operated rental or sale operation, and systems to implement those suggestions, can also be found in U.S. Pat. No. 3,964,577 and United Kingdom Pat. No. 1,475,748 in the name of Bengtsson (automated handling system for coded bank deposition boxes), Japanese Laid Open Gazette Nos. 56-9889 published Jan. 31, 1981, 56-29786 published Mar. 25, 1981 (automated machines for renting out car keys for rental cars), as well as, 49-38689 published Apr. 10, 1974 (automated bowling shoe rental machine). In each of these prior art patents and publications, the product delivery, return and control features of the automated handling system are similar to those that have been applied to automating the rental of video cassettes.

The present invention overcomes these and other problems and provides a machine for dispensing and accepting return of reusable articles, which machine includes a compact, reliable transport mechanism which transfers articles to be dispensed from locations in a stationary, generally planar storage array to a second location accessible to the patron. In this respect, the present invention provides a machine for dispensing reusable articles having a storage arrangement and transfer arrangement which permits the storage of a large number of such articles within, and which immediately returns used articles (previously dispensed articles returned to the machine) to the machine's usable inventory of dispensable articles.

SUMMARY OF THE INVENTION

In accordance with the present invention there is provided an apparatus for dispensing and accepting return of reusable articles each identifiable with its own identification code, the apparatus comprising: a housing including means defining a plurality of stationary locations, each location being capable of holding a reusable article therein and having its own particular location code; receptacle means accessible to a patron for discharging or receiving an article; memory means adapted to hold details of the location codes and the article codes; a computer unit having means for receiving control information and for generating output instructional information and control signals; and transfer means responsive to the computer unit for handling said articles, the transfer means operable for withdrawing a selected article from a location and placing it in the receptacle means, or returning a previously dispensed article from the receptacle means to an empty location within the housing.

In accordance with another aspect of the present invention there is provided a video dispensing system for dispensing and returning reusable video cassettes, each identifiable with its own cassette identification code, the system comprising a plurality of dispensing machines for dispensing and returning the reusable cassettes. Each machine in the system preferably includes means for storing a plurality of the reusable cassettes in locations identifiable by location identification code, means for sensing the cassette identification code, data means for receiving informational data from a patron, transfer means operable to transfer a cassette from a location to a patron when such cassette is identified for rental by the patron and to return a cassette to a location upon return by the patron, memory means adapted to store details of the location codes, cassette codes, and machine operations means for communicating data held in the memory means to a record source external of said machine, means for receiving data from the record source; and a system controller connectable to the memory means of the machines. The foregoing system controller includes the record source which is adapted to hold details of the location identification codes, cassette identifications codes, and operations of the dispensing machines, means for receiving data from the memory means in the machines and storing it in the record source, and means for conveying data from the record source to the machines. The system of the invention is operable to rent a cassette from one machine and to accept return in an other machine by conveying information with respect to the cassette between the renting machine and the return machine via the system controller.

In accordance with another aspect of the present invention, there is provided a mechanism for transferring an article between a first location and a second location, wherein the first location may be one of a plurality of locations in an array having the locations arranged side-by-side, each location having an open end lying in a common plane, and wherein the second location is remote from the array. The transfer mechanism is comprised of: platform means movable in a second plane parallel to the common plane; platform drive means for moving the platform means through the second plane; holder means mounted on the platform means having an article receiving opening for holding an article to be transferred, the holder means being adapted for reciprocal movement relative to the carriage means between a first position wherein the holder means is in an article carrying position and a second position wherein the holder means is shifted toward the array; holder drive means for moving said holder means between said first and second positions; conveyor means mounted to the holder means for conveying an article into or out of the receiving opening when the holder means is in the second position; conveyor drive means; and control means responsive to input information controlling movement of the carriage means, the holder means and the conveyor means.

In accordance with a still further aspect of the present invention there is provided apparatus for holding a video cassette comprising a plastic generally rectangular case having an outer surface and an interior cavity substantially conforming to the shape of a video cassette and dimensioned to receive the video cassette in a single orientation, means permitting insertion and removal of a cassette into the cavity, window means communicating the interior cavity with the exterior of the case, such window means being disposed in a predetermined location in relation to the orientation of the cassette within the case, and locating means disposed on the outer surface for engagement with guide means on a foreign surface, such locating means being disposed in a predetermined location in relation to the window means.

A broad object of the present invention is to provide an apparatus for dispensing video cassette tapes or the like for sale or rent.

Another object of the present invention is to provide an apparatus as defined above wherein the article dispensed may be reusable and may be returned to the apparatus by a patron after use.

Another object of the present invention is to provide an apparatus as defined above, which apparatus is capable of operating alone or with other such apparatus in a network.

Another object of the present invention is to provide an apparatus as defined above, which apparatus includes a compact, accurate and reliable transport mechanism for transferring articles to be dispensed or returned between storage locations within the apparatus and a location accessible to a patron.

Another object of the present invention is to provide an apparatus as defined above which increases the storage capacity for the articles to be dispensed by providing a transfer arrangement operable for selecting and returning articles from two generally-planar, parallel and opposing storage arrays.

A still further object of the present invention is to provide an apparatus as defined above which is operable by credit card, tokens or the like.

These and other objects and advantages will become apparent from a reading of the following description considered with the drawings, and the appended claims.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
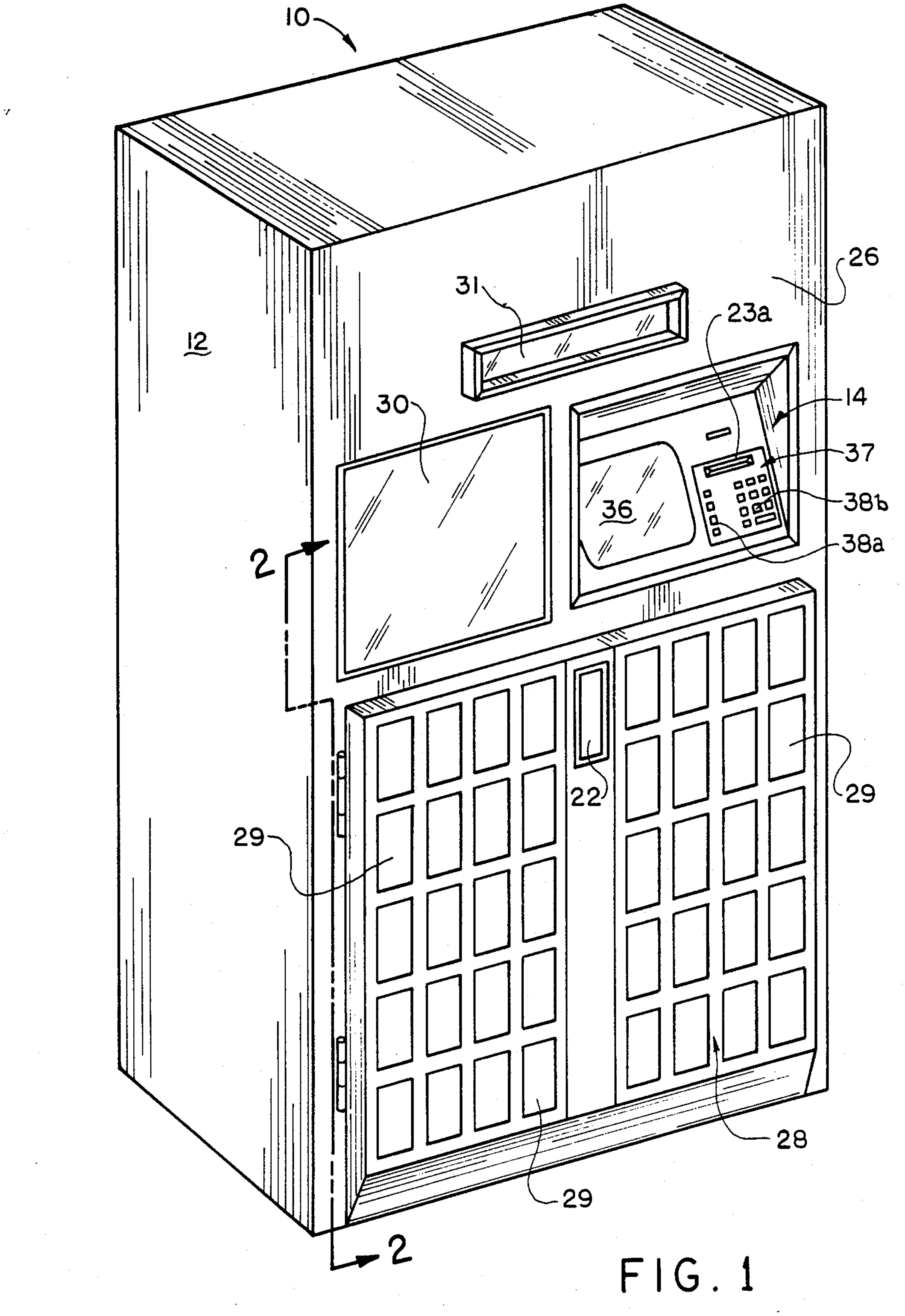
FIG. 1 is a perspective view of a video dispensing machine illustrating a preferred embodiment of the present invention.

Referring now to the drawings wherein the showing is for the purpose of illustrating the preferred embodiment of the invention only, and not for the purpose of limiting same, the drawings illustrate a video cassette dispensing machine designated 10 according to the present invention. Machine 10 is generally comprised of a cabinet or housing 12, a central processing unit (CPU) 14, a control unit 16, a transfer mechanism 18, including an assembly designated as a "picker" 20, and a gate mechanism 22. As shown in FIG. 1, housing 12 includes a front panel 26 having a display section 28 on the lower portion thereof. Display section 28 includes a plurality of advertising blocks 29 within the boundary thereof. Advertising blocks 29 provides space for displaying information, i.e., advertising, regarding the tapes available from machine 10. Above display section 28 are located a large display area 30 and the external portion of CPU 14. Area 30 may be used to advertise a particularly popular or recent film available on tape within machine 10, of for any other purpose. An electronic display 31 is provided to flash a repeating message to the public.

Figure 2A:
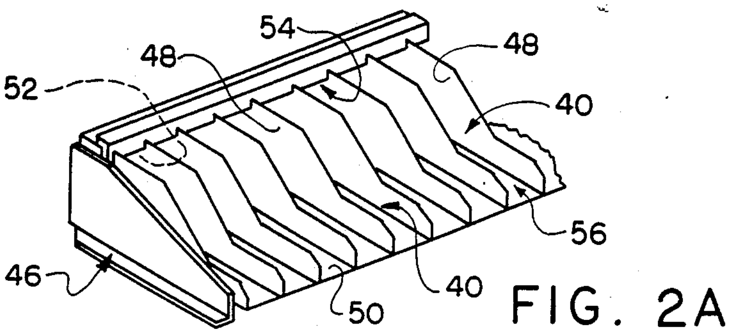
FIG. 2A is a perspective view illustrating a row of cubicles which hold the articles to be dispensed.
Figure 2:
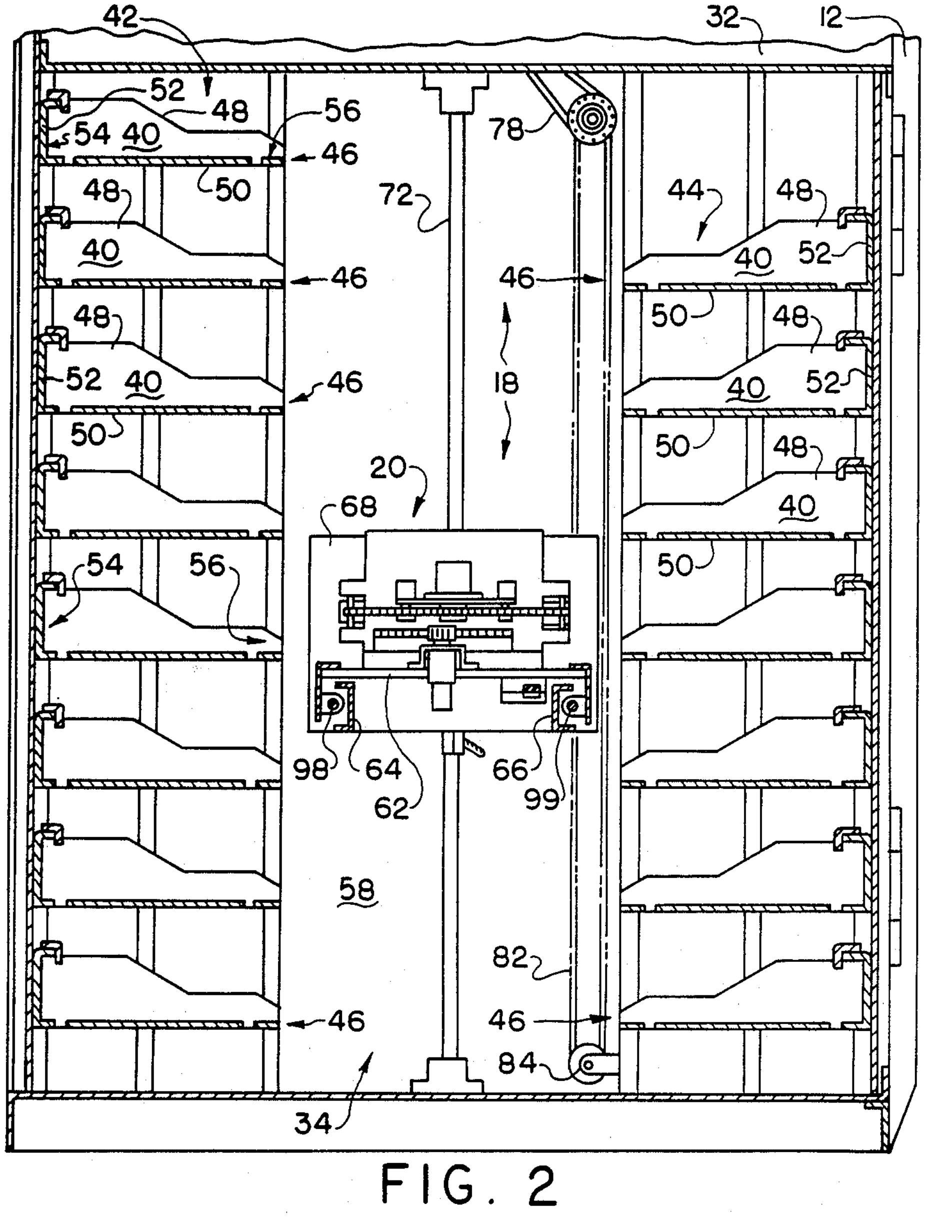
FIG. 2 is a sectional view taken along line 2—2 of FIG. 1.

Referring now to FIG. 2, housing 12 includes two main interior compartments, namely, an upper compartment 32 (partially shown) and a lower compartment 34. Upper compartment 32 houses the CPU 14, control unit 16 and other control circuits. Lower compartment 34 includes the plurality of bins 40 in which the articles to be dispensed (video cassettes) are to be stored. Bins 40 are arranged in two arrays, a back array 42 and a front array 44, which are disposed in an opposing, parallel relationship. Arrays 42,44 are divided into a plurality horizontal rows 46, each having a plurality of bins 40 arranged side-by-side. Arrays 42, 44 can of course be made of any size desired, but according to the preferred embodiment, array 42 is divided into 8 horizontal rows 46, and array 44 is divided into 7 horizontal rows 46, each row including 25 bins. Accordingly, 375 bins are provided in the embodiment disclosed. It will, of course, be appreciated that the number of horizontal rows 46 and the number of bins 40 per row 46 may vary and are limited only by any size limitation which may be set on cabinet 12. With respect to the embodiment shown in the drawings, as set forth above, front array 44 includes one less row than back array 42. Gate assembly 22 (FIG. 10) is positioned in the space defined by the missing row in array 44. Bins 40 may be provided on either side of gate assembly 22 to define an eight row 46 in array 44. In this respect, it is not critical to the present invention that each array 42, 44 contain the same number of horizontal row 46.

Figure 4:
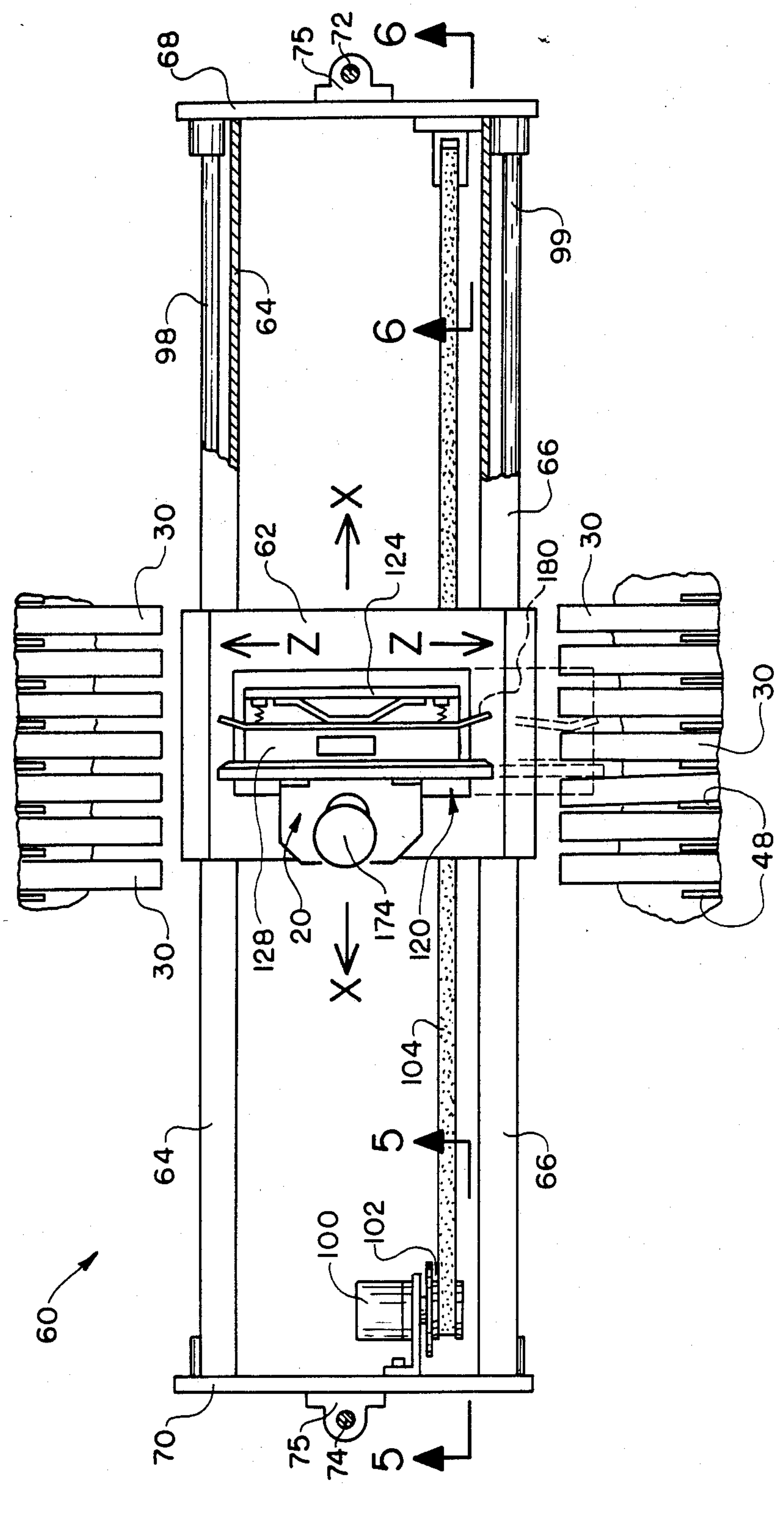
FIG. 4 is a partially sectioned, plan view of the article transfer assembly.
Figure 5:
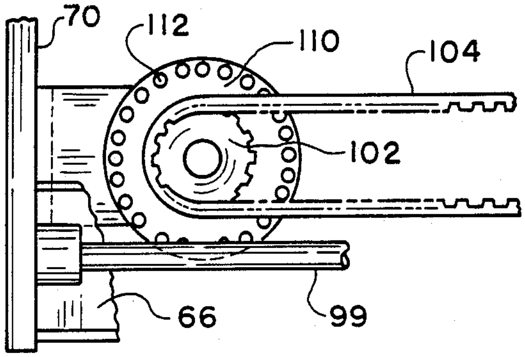
FIG. 5 is a view taken generally along line 5—5 of FIG. 4.
Figure 6:
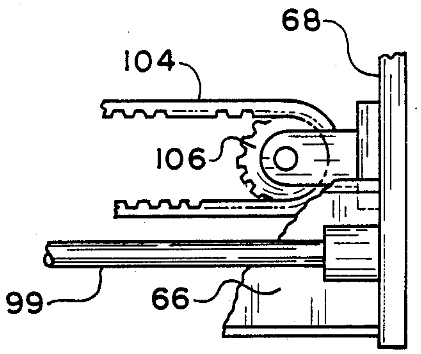
FIG. 6 is a view taken generally along line 6—6 of FIG. 4.

Referring now to FIG. 2A, bins 40 are defined by parallel side walls 48, bottom wall 50 and a back wall 52 and have a closed end 54 and an open end 56. The open ends 56 of bins 40 in each array 42,44 terminate in a common plane, which for the purposes of illustration shall be considered to lie along X and Y axes. In other words, the forwardmost surfaces defining open ends 56 of bins 40 of an array define a vertical plane including axes X and Y. Bins 40 are provided to hold, i.e. store, the articles to be dispensed and returned. In the embodiment shown, the articles to be dispensed are video cassettes. When referring to video cassettes in the present application, it will be understood that such term may refer to VHS cassettes, Betamax cassettes, or 8 mm cassettes, and that the present invention finds advantageous application with cassettes of any of these formats. For reasons which will be explained in detail below, the video cassettes are contained in a cassette storage case 30. Accordingly, bins 40 are dimensioned to hold cases 30 and further to hold case 30 edgewise on their sides, at best seen in FIG. 4. As seen in FIG. 4, side walls 48 are shorter in length than cassette cases 30, such that a portion of cassette case 30 extends beyond the open end 56 of bins 40. A space or opening 58 is defined between arrays 42, 44, and the arrays are arranged such that the open ends 56 of bins 40 in each array face inward toward open space 58.

Central Processing Unit

Figure 11:
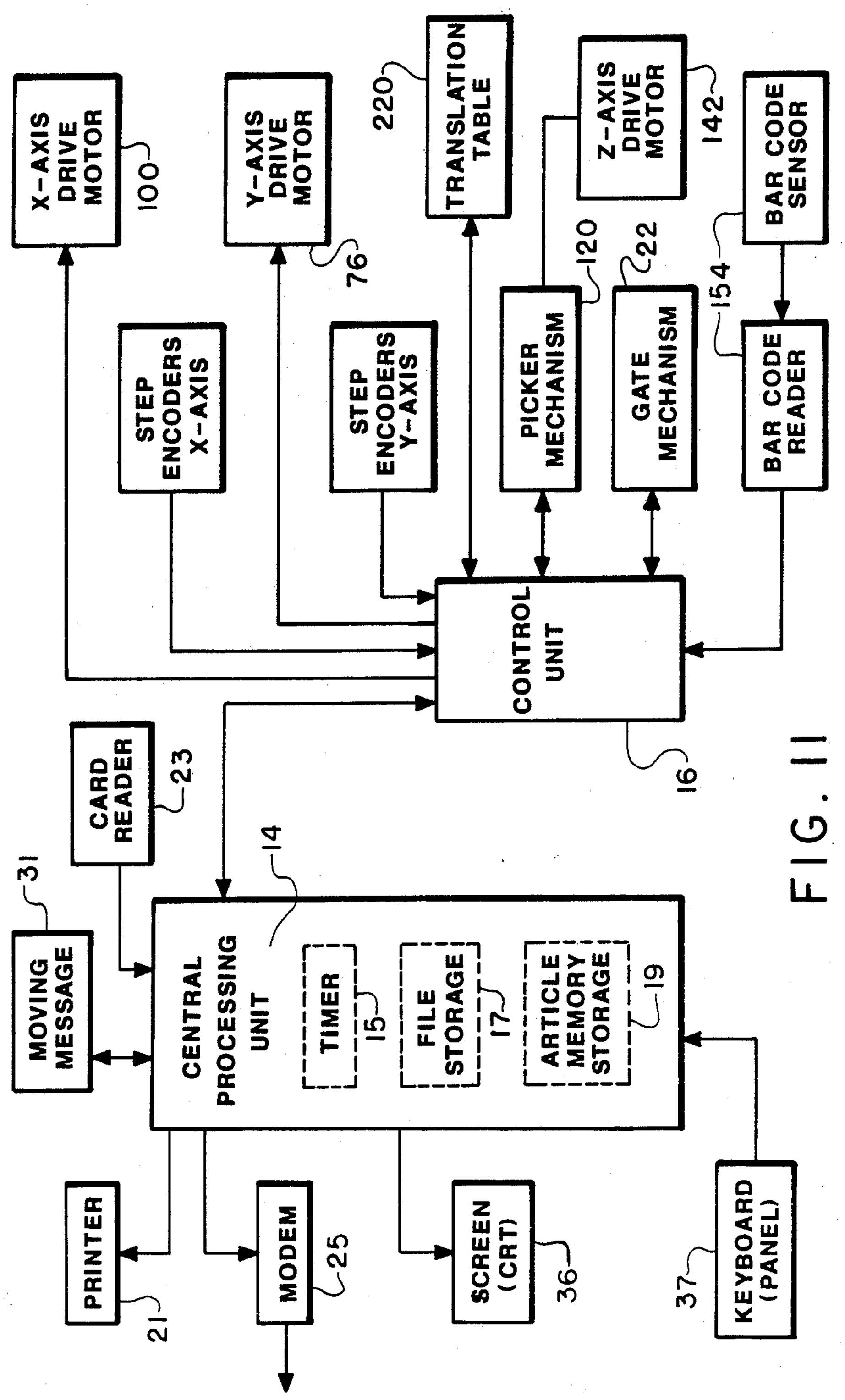
FIG. 11 is a block diagrammatic representation of the internal electronic control system for the embodiment shown.

Operations of the disclosed video dispensing machine are controlled by a central processing unit (CPU) 14 which is schematically illustrated in FIG. 11. In the preferred embodiment of the present invention, CPU 14 internally includes a timer routine designated 15, a file storage routine designated 17, and an article memory storage routine designated 19. Associated with CPU 14 are a printer 21, a card reader 23, the aforementioned electronic display 31, a video monitor screen 36 and a keyboard 37. Broadly stated, CPU 14 monitors and controls two generally separate aspects or functions of the machine i.e., the personal aspects of the dispensing transaction (the financial aspects and the customer interface) and the machine functions of the dispensing procedure. With respect to the former, CPU 14 is provided to accept information data from a prospective patron, to ascertain from such data, together with other data about such prospective patron from a record source, whether the prospective patron has a predetermined status necessary to obtain an article from the dispensing apparatus, to record data regarding dispensing of the article by the apparatus, and to adjust the record data in response to the activities of the patron with respect to the article dispensed. In addition CPU 14 is programmed to provide a patron with information regarding features and functions of the dispensing machine by means of video screen 36 and electronic display 31.

Referring now to FIG. 1, screen 36 of CPU 14 is shown exposed to the exterior, for observation by a patron, while other components thereof are enclosed within upper compartment 32 of cabinet 12. Panel 37 includes a 4-key operation keypad 38*a* and an 11-key alphanumeric keypad 38*b*, for use by a customer for entering information to CPU 14. Screen 36 and panel 37 thus provide an interface between CPU 14 and a prospective customer wherein information regarding available cassettes, operational instructions, monetary matters and the like may be communicated to the patron via screen 36, and information from the patron regarding cassette selections or vending instructions can be communicated to CPU 14 by use of keypads 38*a*, 38*b*.

The information data from the patron is in the form of a conventionally-known credit card having identification data encoded thereon. The credit card is inserted into a slot 23*a* in panel 37 to be read by a card reader (not shown) in a conventional manner. The card provides information identifying the card holder and provides other information with respect to the prospective patron's financial status, which may be in the form of data with respect to financial record files or financial institutions. Such data, utilized together with data from a record file or source, determines whether the prospective patron is authorized to utilize the apparatus. In this respect, the CPU 14 may have an internal record file including the account numbers of all patrons for whom access to the machine is allowed, or it may be connectable by a modem 25 (or directly by a dedicated line) to an external record source such as a financial institution or credit authorization service in a manner conventionally-known in automatic bank teller machines. With information from the credit card, together with information from the internal or external record source, the CPU 14 can determine whether the identified patron has the appropriate status for dispensing, and authorize or prohibit dispensing of an article to the patron accordingly. If authorized, data regarding parameters of the dispensing, i.e., date, time, number of articles etc. are recorded in file storage 17 of the CPU 14. The record file (financial records) of the patrons are modified (debited) based on the period of rental or whether the cassette was purchased by the patron. With respect to this modification of the financial records, if the records are maintain internally by machine 10, such modification can by done by CPU 14. If the financial records are external of machine 10 (financial institution or credit authorization service), information regarding the dispensing transaction are transferred to such external records from CPU 14. As set forth above, communication with the external records may be accomplished by modem 25, as shown in FIG. 11, or directly by a dedicated line (not shown). With a modem arrangement, information concerning several transactions may be stored in file storage 17 throughout the day and then transferred to the external records at one time, thereby saving on transmission and hook-up costs. CPU 14 also includes printer means 21 (not physically shown) for providing patrons with a record of all transactions.

Thus, with respect to the financial and the customer interface aspect of the present invention, CPU 14 basically provides a means for identifying patrons, means for communicating with the patron, means for checking the patrons financial status, means for monitoring the dispensing transaction, and means for modifying the patron's financial records. In this respect, while the preferred embodiment of the present invention utilizes an automatic teller type system, the apparatus may be adapted to operate under receipt of physical tokens or currency.

Referring now to the actual operational functions of the present invention, CPU 14 controls and monitors the physical dispensing of articles to a patron and the return of articles to the machine. In one respect, CPU 14 monitors the exact location of each article stored in arrays 42, 44 and the likewise records articles dispensed from, or returned to machine 10. Articles are monitored by means of an internal program routine and article memory storage function 19. CPU 14 assigns and identifies each bin with its own specific location code number. For example, in the uppermost row 46 of array 42, the bin 40 furthest to the left may be designated "location 1". The cubicle next to the right would be designated "location 2", and so on. The manner in which the bins 40 are numbered is not critical to the present invention. It is only important that each bin 40 is provided with its own particular location number. CPU 14 thus includes a table or listing of location numbers, each of which represents a specific bin 40 in arrays 42, 44.

Figure 13:
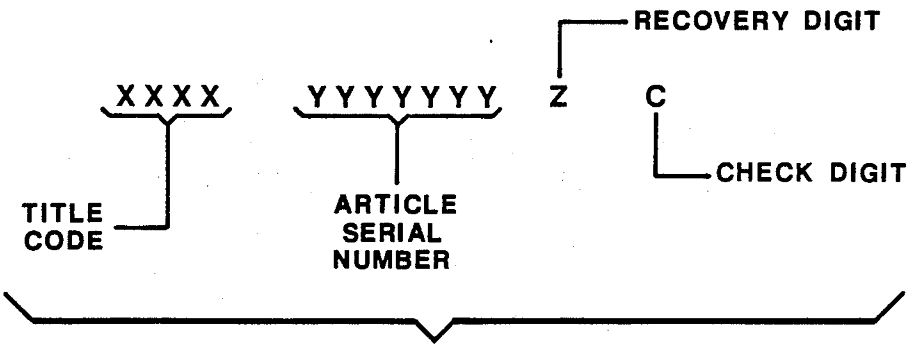
FIG. 13 is a representation of a typical article code for the reusable articles used in the present invention.

Referring now to the reusable articles used in machine 10, each article for use in machine 10 is identified with its own article identification code. FIG. 13 is a representation of a 13 digit article identification code number used in the preferred embodiment of the present invention. In this 13 digit article identification code number, the first four digits designated "XXXX" are a title code number identifying the title of the work to which the identification number is affixed. (As used throughout the specification, "title" shall refer to the artistic work, i.e. movie, contained within the subject cassette). Cassettes containing the same title will have the same title code number. The next seven digit of the article identification code number, which are represented as "YYYYYYY", are an article serial number. Each article (cassette) for use in machine 10 will have its own specific article serial number. The final two digits, represented as "Z" and "C", are operation code digits which in and of themselves are not relevant to the present discussion.

Referring now to the article memory storage function 19 of CPU 14, when a cassette is stored in a particular bin 40, CPU 14 correlates the location code number of such bin 40 with the article identification code of such cassette. In this respect, article memory storage 19 maintains a table of bin location code numbers wherein each location code number has a correlating article identification code number indicative of the cassette stored within that particular bin. The table of correlated location code numbers and article code numbers (hereinafter referred to as "location/article table") is constantly revised by CPU 14 to reflect cassettes dispensed or returned to machine 10 in a manner which will be understood with a further reading of the specification.

CPU 14 is connected to control unit 16 as shown in FIG. 11. Control unit 16 controls transfer assembly 18 which physically dispenses and returns cassettes from or to bins 40 in machine 10. Control unit 16 will be described in greater detail below. With respect to the interaction between CPU 14 and control unit 16, CPU 14 initiates dispensing by providing a command signal to control unit 16, and further providing information regarding information pertaining to the cassette to be dispensed. This information is in the form of the location code number of the bin 40 holding the cassette to be dispensed. As will be described below, this information is used by control unit 16 to dispense the desired cassette. When a cassette is returned to machine 10, CPU 14 receives information from control unit 16 as to the article code number of the cassette returned and the location code number of the bin 40 in which the cassette was placed.

Transfer Assembly

Figure 3:
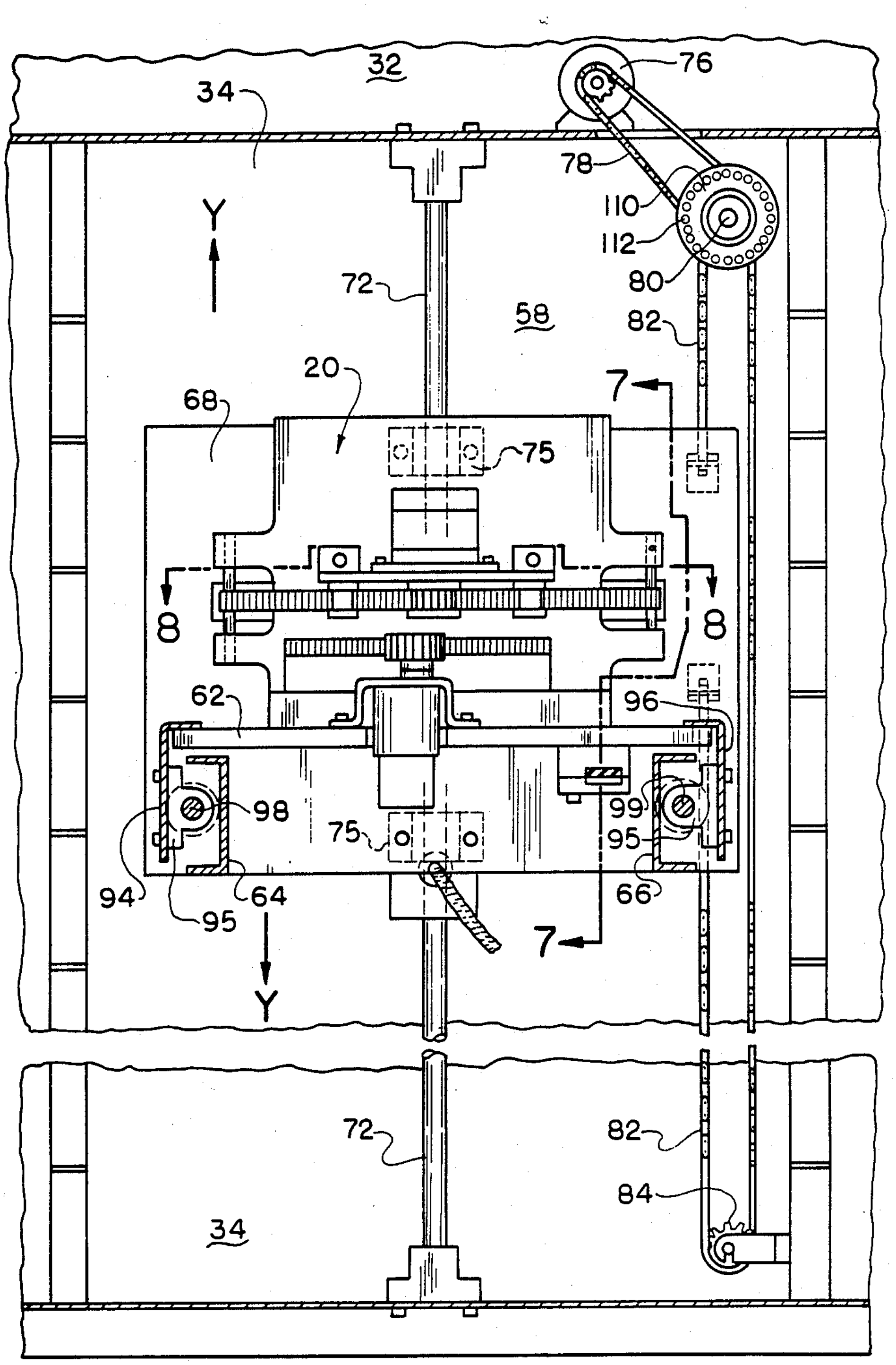
FIG. 3 is an enlarged elevational view of the article transfer assembly shown in FIG. 2.

Transfer assembly 18 is provided to transfer a designated cassette from a selected bin 40 to gate mechanism 22 where such cassette is accessible to a patron. Transfer assembly 18 is comprised of a horizontal track 60 (best seen in FIG. 4), a platform 62 movable along track 60, and picker assembly 20 situated on platform 62 and movable therewith. Track 60 is basically an elongated frame comprised of two parallel rail members 64, 66 secured at their distal ends to end plates 68, 70. Track 60 is adapted for vertical movement throughout the range of horizontal rows 46. (For the purpose of illustrating the present invention, in the specification and drawings, vertical movement shall be designated as movement along a Y axis, horizontal movement shall be designated as being along a X axis, and movement perpendicular to an X,Y plane shall be designated as being along a Z axis). In this respect, track 60 is movable between arrays 42, 44 in opening 58. Movement of track 60 is guided by fixed vertical guides 72, 74 which extend through conventionally-known pillow blocks 75, mounted on end plates 68,70 respectively. Vertical movement of track 60 is effected by a drive arrangement best seen in FIG. 3. A motor 76 is mounted in fixed position within upper compartment 32 of cabinet 12. Motor 76 drives a timing chain 78 which in turn drives a shaft 80 by means of a gear (not shown). Shaft 80 extends across the width of cabinet 12 to drive a pair of spaced timing belts 82 trained on idler gears 84. One of timing belts 82 is fixedly mounted to end plate 68 of track 60 as shown in FIG. 3. The other belt 82 is connected in like manner to end plate 70 of track 60 (not shown). The belt arrangements at each end of track 60 are identical and dimensioned such that both belts 82 move in unison upon rotation of shaft 80. Accordingly, track 60 moves vertically in opening 58 to various positions corresponding to rows 46 in response to actuation of motor 76 and the corresponding rotation of shaft 80. A counterweight arrangement (not shown) is provided to assist motor 76 in the movement of track 60.

Figure 7:
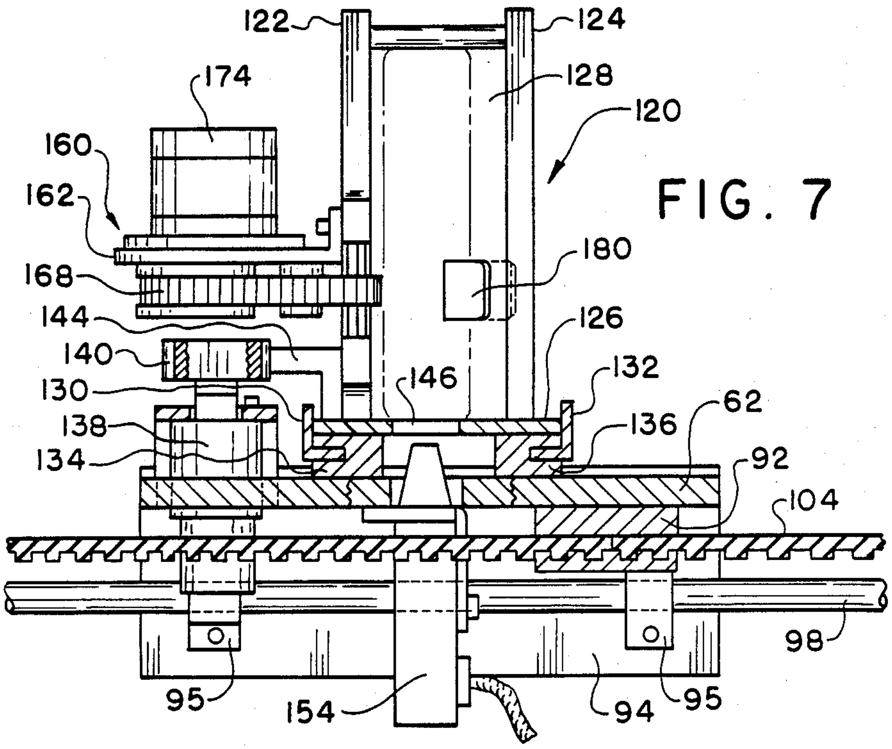
FIG. 7 is a sectional view taken generally along line 7—7 of FIG. 3.
Figure 8:
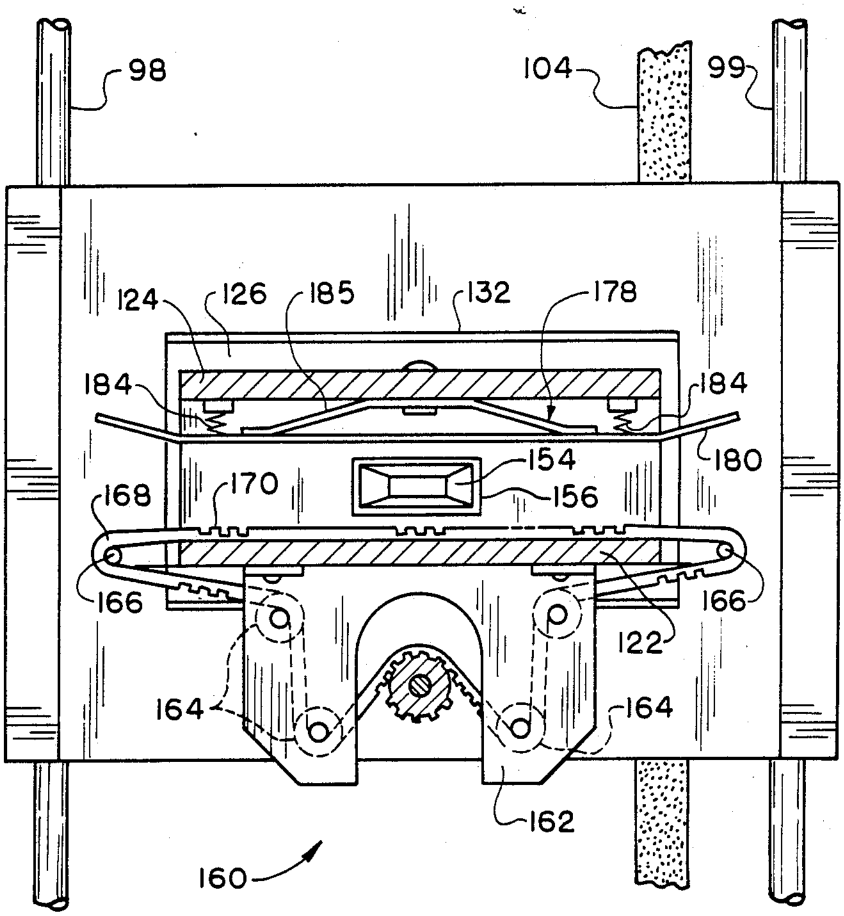
FIG. 8 is a sectional view taken generally along line 8—8 of FIG. 3.
Figure 9:
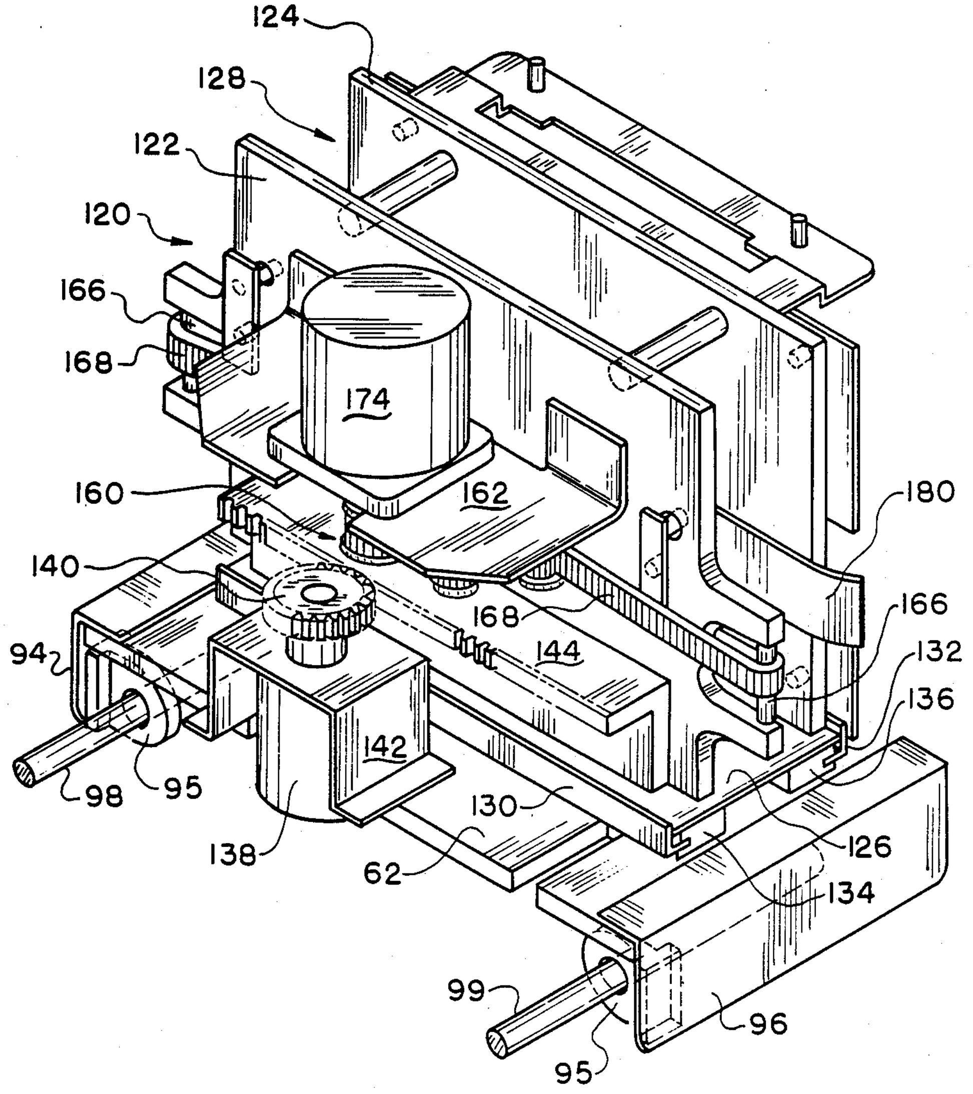
FIG. 9 is a perspective view of the assembly shown in FIGS. 7 and 8.

Platform member 62 includes lateral side walls 94, 96 which overlap rail members 64, 66 as shown in FIG. 3. A pair of fixed horizontal guide 98,99 extend parallel to rail members 64, 66. Guides 98, 99 extend through conventionally-known pillow blocks 95 secured to side walls 94, 96 of platform 62. Platform 62 is moved horizontally along horizontal guides 98, 99 by means of a motor 100 shown in FIG. 4. Motor 100 is fixedly secured to end plate 70 of track 60 and includes a gear 102 which drives a timing belt 104 on idler gear 106. Belt 104 is fixedly secured to the base of platform member 62 by a clamp arrangement 92, shown in FIG. 7. Platform member 62 thus moves horizontally across track 60 in response to actuation of motor 100.

Motors 76, 100 are each provided with a positional sensing arrangement to determine the angular rotation of their respective shafts. The sensing arrangement for each motor is generally identical and is comprised of what is conventionally referred to as "a step counter" in the form of a circular disk 110 having a plurality of angularly-spaced openings 112 formed therein. Disk 110 is mounted on the shafts of motor 76 and motor 100 for rotation therewith. A light source (not shown) is disposed on one side of disk 110 and a light sensitive element (not shown) is positioned on the other side of the disk 110. When light from the light source shines through an opening 112 of disk 110, it activates the light sensitive element to produce a "pulse" or "step-count". Counting means are provided with control unit 16 to count each activation or "pulse" of the light sensitive element. In this respect, as disk 110 rotates, a "pulse" will be counted as each opening 112 passes the light source and light sensitive element. Each light pulse, or step, thus represents a specific angular degree of rotation of the shaft of the motor to which disk 110 is attached, which rotation can be related to the linear displacement of track 60 and platform 62 relative to cubicles 40 in arrays 42 and 44. Specifically, disk 110 on motor 76 provides an indication of the position of track 60 along the Y axis, and disk 110 on motor 100 provides an indication of the position on platform 62 along the X axis.

Picker Assembly

Picker assembly 20, shown in FIGS. 3, 7, 8 and 9, is mounted on platform 62 and includes a platen assembly 120 comprised of two generally parallel, spaced-apart plates or platens 122, 124 mounted to a base plate 126. Plates 122, 124 define an article receiving opening 128 therebetween. Along the lateral edges of base plate 126, L-shaped slide members 130, 132 are provided. Slide members 130, 132 are positioned within guides 134, 136 which permit sliding movement of platen assembly 120 relative to platform 62. Platen assembly 120 is movable in a direction perpendicular to the directions of movement of track 60 and platform 62. In other words, assembly 120 is movable along the Z axis. A reversible drive motor 138 having a pinion gear 140 is fixedly mounted to platform 62 on a bracket 142. Gear 140 engages a rack 144 which is fixedly mounted to platen 122. Platen assembly 120 is thus movable in either direction along the Z axis in response to actuation of motor 138. Movement of platen assembly 120 in either direction is limited by optical limit switches (not shown) in a manner which is conventionally known. An optical limit switch (not shown) is also provided to indicate when platen assembly 120 is in a central, neutral position relative to platform 62. Base plate 126 is provided with a rectangular opening 146 therethrough. A code sensor and reader 154 is provided below plate 126 to read an article code on any article positioned above base plate 126 between plates 122, 124.

A conveyor arrangement designated 160 is mounted to plate 122. Conveyor arrangement 160 is comprised of a bracket 162 fixedly mounted to plate 122. Bracket 162 includes a plurality of guide rollers 164 extending therefrom, which guide rollers 614 are aligned with idler rollers 166 mounted on the longitudinal ends of plate 122. Guide rollers 164 and idler rollers 166 define a path for an endless flexible conveyor belt 168. Belt 168 encircles plate 122 and includes a portion which extends along a straight run between plates 122, 124. Conveyor belt 168 is dimensioned to have outward facing teeth 170 to catch or grab an article (cassette) as will be described in more detail below. A reversible stepping motor 174 mounted on bracket 162 operatively engages belt 168 to drive belt 168 along the predetermined path.

A "floating" rail assembly 178 is provided on plate 124. Rail assembly 178 is comprised of a rail member 180 which is mounted near its distal ends to plate 124. Rail member 180 is biased away from plate 124 by spring members 184, 185 such that rail 180 is movable relative to plate 124 by case 30, as shown in phantom in FIG. 7. The distal ends of rail 180 are curved to facilitate entry of case 30 into opening 128 defined by plates 122, 124 from either side thereof. Rail 180 is movable from a first position projecting away from plate 124 to a second position closer to plate 124. Optical switches (not shown) are provided to indicate movement and the position of each end of rail 180 with respect to plate 124.

Gate Assembly

Figure 10:
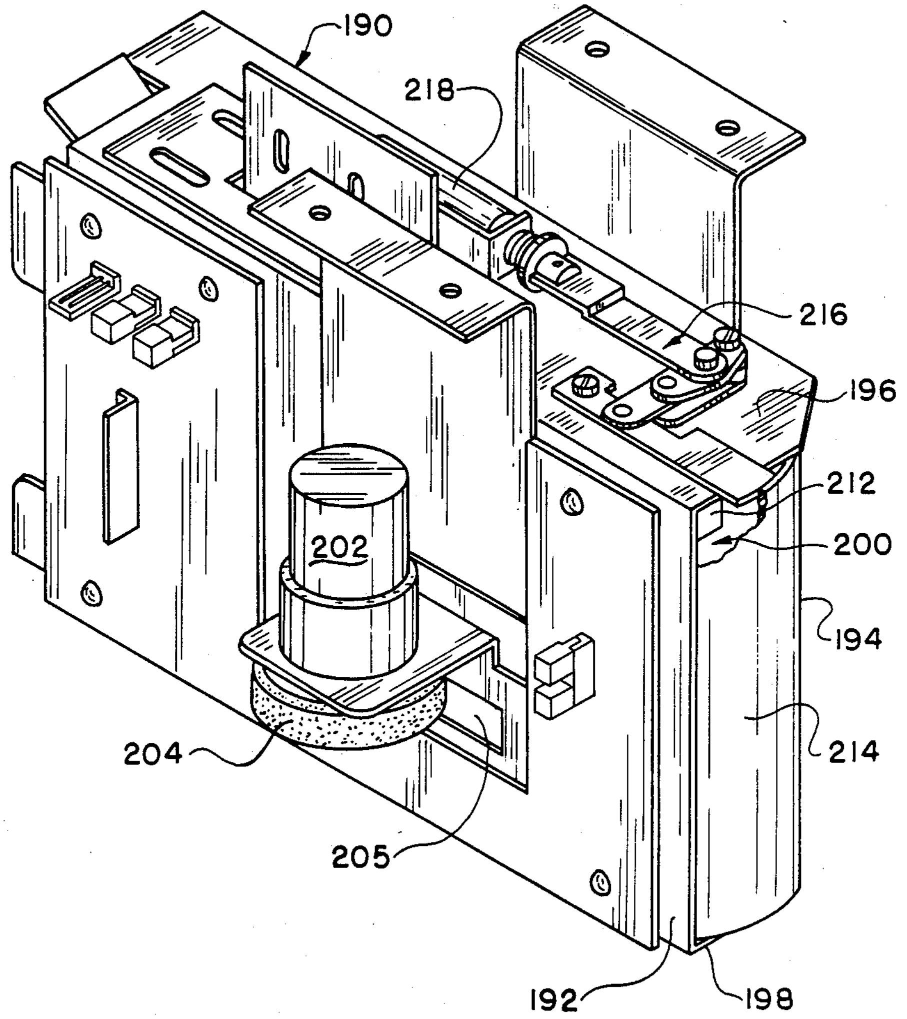
FIG. 10 is an enlarged perspective view of the "gate" mechanism of the present invention.

Referring now to FIG. 10, gate assembly 22 is provided as an opening or receptacle, accessible to a patron, for discharging and receiving a cassette within case 30. Gate assembly 22 is comprised of a generally rectangular housing 190 having side walls 192, 194, top wall 196 and bottom wall 198. Housing 190 defines a generally rectangular opening 200 for receiving the article to be dispensed or returned. A drive motor 202 is fixedly mounted to side wall 192 and includes a drive roller 204 which extends into opening 200 through a rectangular aperture 205 in side wall 192. Optical switches (not shown) are provided at predetermined locations within opening 20 to indicate the presence or absence of a cassette or article within opening 200. A shoulder 212 is formed or otherwise provided at the juncture top wall 196 and side wall 192 to act as a guide and a means for orienting a case 30 within opening 200. A gate member 214 is pivotally mounted to housing 190. A linkage 216 connects gate member 214 to a solenoid 218. Solenoid 218 and linkage 216 are operable to move gate member 214 away from opening 200 to allow passage of a case 30 therethrough. Gate assembly 22 may be located at any location in the front array 44 to facilitate access to a patron, but in the preferred embodiment is centrally located in panel 26, as shown in FIG. 1.

Control Unit

The physical operations of the disclosed video dispensing machine are basically controlled by a control unit 16 which is schematically illustrated in FIG. 11. Control unit 16 is programmed to control operations of the various component of apparatus 10 by means of a program stored therein. Control unit 16 is connected to motors 76 and 100 and provides output signals thereto by which it controls the respective movement and position of track 60 and platform 62. The step counters arrangements, associated with drive motors 76 and 100, provide input to control unit 16 to indicate the locations of track 60 and platform 62 relative to bins 40. The input provided to control unit 16 from motors 76 and 100 is in the form of individual X and Y coordinates. To relate such coordinates to the bin location code numbers stored in CPU 14, a translation table, designated 220 in FIG. 11 is provided as part of control unit 16. In this respect, the bin location code numbers stored in CPU 14 have corresponding X, Y coordinates in table 220.

Referring now to picker assembly 20 and gate assembly 22, control unit 16 is connected to motor 138 which controls the movement of platen assembly relative to platform 62, motor 174 which controls conveyor belt 168 on picker assembly 20, and motor 202 and solenoid 218 on gate assembly 22. In addition, input data is provided to control unit 16 from the various optical limit switches associated with picker assembly 20 and gate assembly 22. Control unit 16 is thus operable to control movement of picker assembly 20 between gate assembly 22 and bins 40 located in arrays 42, 44, and further to control operation of gate assembly 22. Control unit 16 is also connected to and receives input information from article code reader 154 to monitor cassettes held by picker assembly 22. Such information is utilized by control unit 16 to ensure dispensing of an appropriate cassette, and is conveyed to CPU 14 for processing thereby.

Cassette Storage Case

Figure 14:
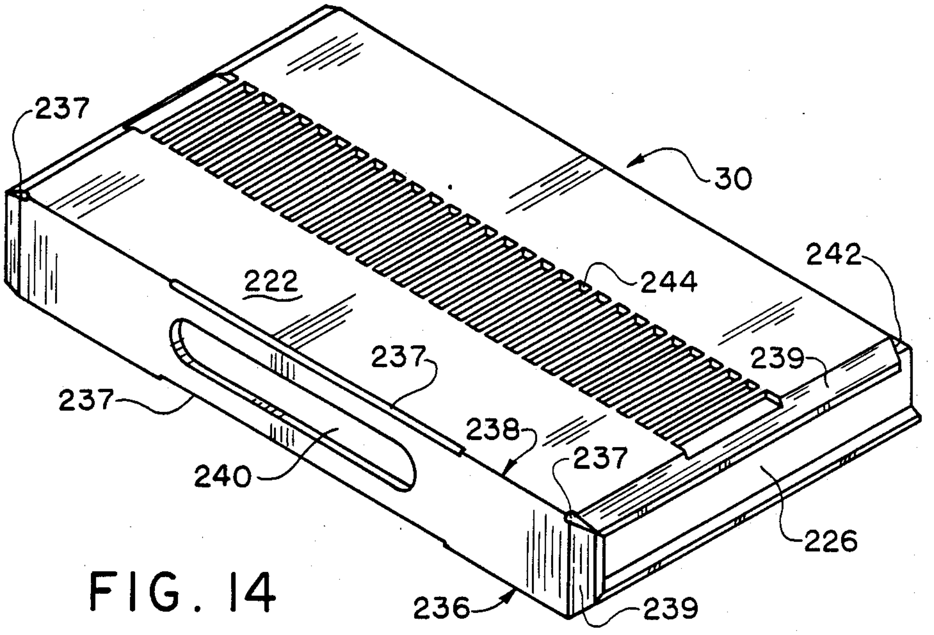
FIG. 14 is a perspective view of a videocassette storage case for use with a video dispensing machine according to the present invention illustrating one side thereof.
Figure 15:
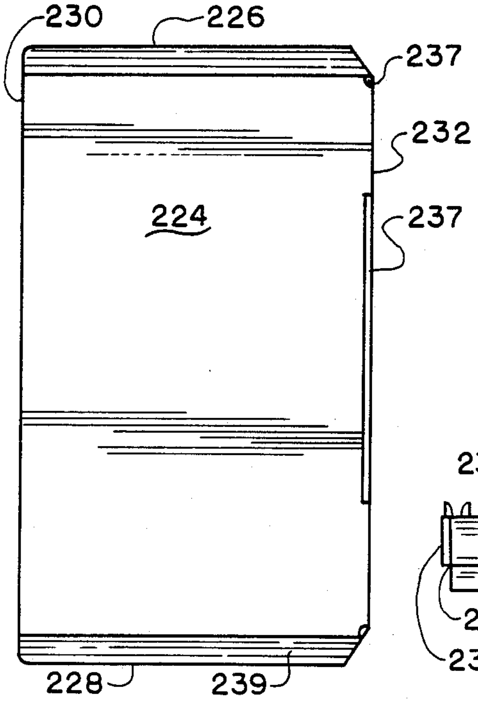
FIG. 15 is plan view of the storage case shown in FIG. 14 illustrating the other side thereof.
Figure 16:
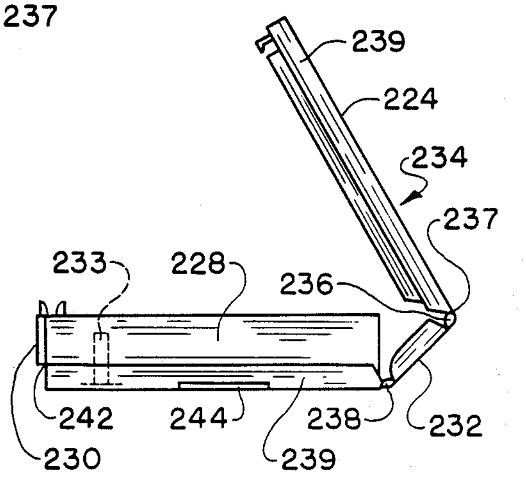
FIG. 16 is an elevational end view of the storage case showing the cover portion in an open position.

As set forth above, each cassette (article) to be dispensed is provided with an article identification code to be read by an article code reader 154 which is positioned beneath bottom plate 126 on platen assembly 120. The identification code is utilized by the central processing unit 14 and control unit 16 to identify cassettes returned to the machine and to determine the position of each article stored within arrays 42, 44. In this respect, to ensure proper reading of the identification code, it is important that the cassette be inserted into the machine 10 in such a manner that the article identification code faces downward toward baseplate 126 and the code reader 154 therebelow. It is also important that the cassettes be amenable to repeated handling by the transfer mechanism without damage thereto. To these ends, a video cassette storage case 30 is provided, as seen in FIGS. 14, 15 and 16. Case 30 has a generally rectangular shape defined by a pair of side walls 222, 224, end walls 226, 228, a top wall 230 and a bottom wall 232. Case 30 includes an interior cavity substantially conforming to the shape of a video cassette. A pin 233, shown in phantom in FIG. 16, is provided to interact with a bore found on typical cassettes, such that case 30 receives the video cassette in a single orientation. Case 30 is dimensioned such that the interior conforms to the shape and dimensions of a VHS video cassette. It will of course be appreciated that case 30 could be dimensioned to hold Betamax or 8 mm cassettes. Side wall 224 and bottom wall 232 form a cover portion 234 hinged along lines 236 and 238. In this respect, case 30 is molded or otherwise formed of a tough yet pliable plastic materials wherein the material along lines 236, 238 define what is conventionally-known at a "living hinge". To facilitate ease of flexing, apertures 237 may be provided along hinge lines 236, 238. In the embodiment shown, case 30 includes inwardly tapered portions 239 which extend beyond end walls 226, 228. These tapered portions 239 facilitate entry of case 30 into platen assembly 120.

Although an identification code for the cassette held therein may be affixed to case 30 itself, to ensure dispensing of the proper video cassette to the patron, and further to ensure a proper cassette is returned by the patron, it is preferable that the identification code is placed on the cassette. Accordingly, an elongated slot or a window 240 is provided through bottom wall 232. Window 240 is disposed in a predetermined location in relation cassette within case 30, wherein the identification code on the cassette aligns with, and shows through, window 240. A groove or notch 242 is formed along the corner formed by walls 222, 230. Notch 242 is dimensioned to correspond to shoulder 212 of gate assembly 22. Notch 242 is provided as a means of aligning and orienting case 30 with gate assembly 22. In this respect, case 30 and gate assembly 22 are dimensioned such that insertion of a case 30 into gate assembly 22 is possible only when notch 242 and shoulder 216 are aligned. This ensures that window 240 (and thus the identification code on the cassette) is properly aligned with code reader 154 on picker assembly 20.

Figure 12:
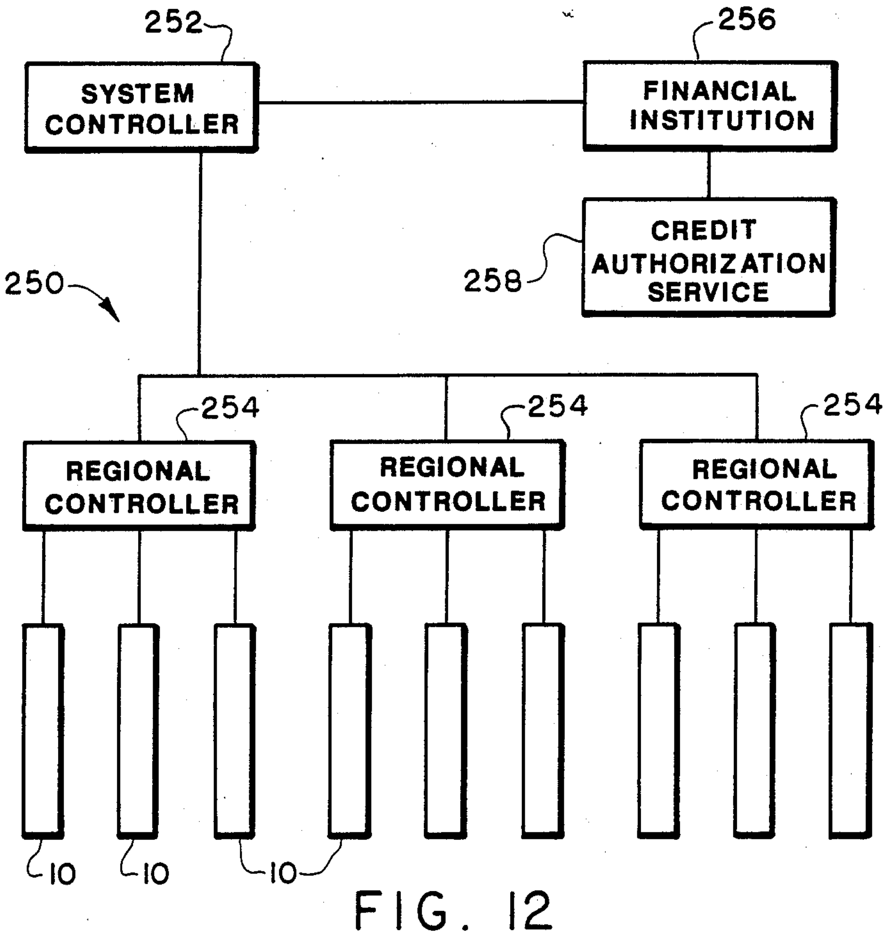
FIG. 12 is a block diagrammatic representation of a network system including a plurality of video dispensing machines according to the present invention.

Case 30 is also provided with a corrugates or "rack-like" portion 244 extending along side wall 222, as best seen in FIG. 12. Portion 244 is positioned and dimensioned to engage belt 168 on picker assembly 20 to facilitate picker assembly 20 in grabbing and conveying case 30 into article receiving opening 128 between platen plates 122, 124. In this respect, the surface configuration on portion 244 is dimensioned to cooperate with 170 on conveyor belt 168. Case 30 is preferably formed as an integral unit. Although case 30 may be formed from many different materials, it is preferably formed of a plastic composition which is of sufficient rigidity to maintain its structural dimensions yet pliable enough to permit flexing of cover portion 234 at hinge lines 236 without cracking or breaking.

Network System

Heretofore, a single dispensing machine 10, having either an internal record source or an arrangement for access to an external record source, has been described. FIG. 12 illustrates a network system, designated 250, incorporating another aspect of the present invention. Network system 250 is comprised of a system controller 252 connected to a plurality of video dispensing machines 10 of the type heretofore described. If the number of dispensing machines 10 in the network system is sufficiently large, regional controllers 254 may be provided between groups of dispensing machines 10 and system controller 252, as seen in FIG. 12. Controllers 252, 254 are basically computers or processing units operable to monitor and control the CPU 14 of each dispensing machine 10 to which it may be connected. System controller 252 (or even regional controllers 254) is connectable, either by a modem hook-up or a dedicated line to external record sources such as financial institutions 256 or credit authorization services 258.

A primary function of system controller 252 and regional controllers 254 is to monitor the dispensing and return of articles within the system. In this respect, each cassette within system 250 is provided with a unique article code number. System controller 252, regional controller 254, and CPU 14 in each machine 10 are connected and operable such that information regarding each article code number (i.e., information regarding vending and/or return of the respective cassette) may be communicated through the system. Thus, if a cassette is dispensed from one machine 10 and returned to another machine 10 in the system, information regarding such transactions may be conveyed to the respective machines 10 to adjust the storage files 17, 19 therein.

An additional feature of network system 250 is that programmable functions of CPU 14 may be modified by system controller 252 and/or regional controller 254. In the preferred embodiment, system controller 252 is operable to vary programs within region controller 254 and CPU 14 in machines 10. In this respect, the system operator can vary programs in each machine 10, either individually, in a group, or all together, from one location with system controller 252. For example, price changes for renting cassettes can be made throughout the system by means of instructions from system controller 252.

With respect to regional controllers 254, such controllers may or may not be required depending on the number of machines 10 within the system. The advantages of a regional controller is that it may perform some of the functions of the system controller 252 (i.e. store information regarding transactions, maintain record files, or communicate with outside record sources) in the event that the system controller 252 is inoperative or unavailable (such as because it is performing other functions). In additional regional controllers 254 may be cost effective through limiting use of communication lines (telephone lines). For example, regional controller 254 may store information from various machines 10 to convey that information at one time to system controller 252. In this respect, regional controllers 254 may be located where only local connections to the machines 10 are required, thereby reducing long distance connections to the system controller 252.

OPERATION OF PREFERRED EMBODIMENT

Referring now to the operation of the preferred embodiment of the present invention, CPU 14 includes a step-by-step instructional program to assist patrons in the use of machine 10. The instruction program is displayed on screen 35 and the various instructional steps are sequenced in response to information entered by the patron through keys pads 38A, 38B on panel 37. In the preferred embodiment, graphic illustrations (which will not be described in that they form no part to the present invention) are provided with the instructions on screen 36 to aid the patron in determining the action required in using machine 10.

When a patron approaches machine 10, screen 36 will be displaying a message identifying the machine and instructing the patron where to insert his/her credit card (or any magnetically readable card). The patron inserts a credit card into slot 23*a* of card reader 23 on panel 37. Data on the card indicates to CPU 14 whether it is a customer card or a service representative card. Service representative cards may be provided to service personnel for servicing the machine. In this respect, an internal program or service routine may be activated to assist such personnel in conducting service checks for the machine. It the card is identified as a customer card, screen 36 displays a message requesting that the patron selects one of three different operating routine or modes, i.e. a rental mode, a purchase mode, or a return mode. Each mode of the routine of operation shall be discussed individually.

Referring now to the "rental mode", the patron or customer selects the rental mode by pressing the appropriate operation key on key pad 38*a*. Screen 36 then displays a message instructing the patron to enter a title code for the desired cassette on the alphanumeric keyboard 38*b*. If the displayed alphanumeric code is incorrect, the internal instructional program advises the customer how to clear and to re-enter the correct title code of the desired cassette. Otherwise, machine 10 assumes that the patron has entered the correct number. Rental information with respect to the selected cassette is then displayed on screen 36. Such information includes the title of the requested cassette as well as the rental rates for specified periods of time. At this point, the customer checks that this is the desired cassette and provides an instruction, via the keyboards, for machine 10 to proceed. At this time, CPU 14 checks the status of the patron identified on the credit card. In this respect, as set forth above, each machine may maintain its own internal record source with respect to cardholders who are allowed to use the machine. Alternately, the machine may be capable of accessing remote record sources to ascertain the status of the patron. Accordingly, if the patron is listed within an internal record, the sequence may proceed. If the customer is not within an internal file, CPU 14 may request a credit authorization from an outside record source. If machine 10 operates as a stand-alone unit, such access may be made directly from CPU 14 to a record source via a modem arrangement or direct line hook-up. If machine 10 is part of the network system as shown in FIG. 12, credit authorization may be requested through the network. At this time, screen 36 displays a message requesting that the patron "PLEASE WAIT". If CPU 14 receives a credit rejection from either the network or a remote record source, screen 36 advises the patron that it is unable to process the request and returns his/her credit card thereby ending the transaction. If the customer is in the internal file or the terminal receives a credit approval from the network or the remote record source, CPU 14 instructs control unit 16 to dispense a copy of the selected cassette.

With respect to the actual dispensing of the cassette, when a title has been selected, and the credit status of the patron approved, CPU 14 uses the title code and searches for such title in the location/article table stored within article storage memory 19. In the preferred embodiment, CPU 14 has been programed to search through the bin numbers in the location/article table in consecutive order, beginning from the bin number of the last title previously searched. In other words, if the last previously dispensed cassette came from bin number 93 of the location/article table, CPU 14 would search consecutively through bin numbers 93 through 375 until a copy of the selected title is found. If not found in these bins, CPU 14 continues its search consecutively through bin numbers 1 through 92. It will, of course, be appreciated that a plurality of copies of a given title will generally be held within arrays 44, 42, and that such copies will be randomly located throughout the bins (as will be understood from a further reading of the specification, particularly with the respect to the "return mode"). In this respect, a search through the entire location/article table will not be required to locate a copy of the selected title. It is believed that the search program just described provides a random selection among the copies of the selected title, and that this procedure ensures that a particular copy of a title is not repeatedly used more than other copies and dispensed to patrons. An alternative method of ensuring that a single copy of a title is not repeatedly used more then others, is to program CPU 14 to monitor each time a particular cassette is dispensed, and to dispense the least used copy of the selected title. In this manner, the machine provides the patron with the best (least used) available copy of the selected title.

When CPU 14 has searched the article/location table in storage memory 19 and located a copy of the selected title, the bin number in which the cassette is held is transmitted to control unit 16. Using translation table 220, control unit 16 converts the bin number into X,Y coordinates to determine the location of the bin containing the selected cassette in the X-Y grid. With such information, control unit activates motors 76 and 100 to move track 60 and platform 62, respectively, into registry with the appropriate bin in which the cassette to be dispensed is located. In the preferred embodiment, vertical movement of track 60, and horizontal movement of platform 62 occur simultaneously. When positioned in front of the appropriate bin, motor 138 is activated to move platen assembly 120 from its first, normal or neutral position to its second position wherein assembly 120 is in engagement with the case 30 holding the desired cassette. As best seen in FIG. 4, platen assembly 120 is brought into engagement with the exposed portion of case 30. The end of case 30 engages the curved end portion of rail member 180, and at the same time, engages conveyor belt 168 (FIG. 9) of conveyor arrangement 160. Upon engagement with case 30, rail member 180 is cocked such that the one end of rail member 180 engaging case 30 is deflected toward plate member 124. Such movement activates a limit switch associated with the deflected end of rail member 180 which indicates to control unit 16 the presence of a case 30 in the designated bin. At this time, conveyor motor 174 is activated in a direction which draws case 30 out of the bin into article receiving opening 128 of platen assembly 120. As case 30 is drawn into the picker assembly, rail member 180 is deflected until the leading end of case 30 approaches the other end of rail 180 and causes it to deflect toward platen 124. Optical limit switches (not shown) associated with platen assembly 120 indicate when case 30 is centrally positioned therein. Control unit 16 then deactivates conveyor motor 174, with case holder 30 positioned within article receiving opening 128 of picker assembly 120. Upon deactivation of conveyor motor 174, platen drive motor 138 is activated to return platen assembly 120 to its neutral or normal, first position centrally located on platform 62. Optical limit switches associated with platen assembly 120 indicate to control unit 16 when platen assembly has returned to such first position. Importantly, as the selected cassette is being moved from the bin to article receiving opening 128, code reader 154 (FIG. 8) reads the article code thereon to determine that the appropriate cassette is being dispensed to the patron. The control unit 16 then activates motors 76 and 100 to transfer picker assembly 20 into registry with gate assembly 22. As set forth above, the position of picker assembly 20 relative to the bins in arrays 42, 44 and relative to gate assembly 22, is monitored by the control unit 16 based on signals obtained from the stepping arrangements associated with motors 76, 100.

When picker assembly 20 with the cassette to be dispensed is in registry with gate assembly 22, conveyor motor 174 is activated in a direction appropriate to drive case 30 into gate assembly 22. The optical limit switches (not shown) associated with platen assembly 120 and gate assembly 22 indicate when case 30 has been transferred from platen assembly 120 to gate assembly 22 at which time conveyor motor 174 is deactivated. At the same time conveyor motor 174 is driving case 30 out of platen assembly 120, solenoid 218 (FIG. 10) is activated to shift gate member 214 away from opening 200, and drive motor 202 is activated in a direction which will drive case 30 through opening 200 and past gate member 214 wherein case 30 is available to the patron. When the customer removes the cassette from gate assembly 22, the optical sensors therein provide CPU 14 with an indication of such removal. Solenoid 218 is thereby deactivated to shift gate member 214 across opening 200, and drive motor 202 is deactivated. Upon completion of the transaction, the customer is provided with a receipt of the transaction from printer 21, and his/her credit card is returned. The time of dispensing and the article identification code of the cassette dispensed is recorded by CPU 14 in file storage 17 for later use by the CPU 14 for the purposes of billing the patron. In this respect, in addition to being retained within file storage 17 of CPU 14 within the machine, if the machine is one of several such machines in a network system as shown in FIG. 12, such information may be transmitted immediately or periodically (together with information on other transactions) to the machines regional controller 254 or to the system controller 252 for use thereby in monitoring return of the cassette elsewhere within the system.

Referring now to operation of the "purchase mode", this mode generally follows much of the same procedures outlined with respect to the rental mode. In this respect, the patron selects the operation mode by pushing the appropriate operation key on keyboard 38*a*. Screen 36 advises the patron to enter the appropriate title code numbers of the desired cassette using the alphanumeric keyboard 38*b*. As above, the customer may correct erroneously entered code letters and/or numbers. Cassette purchase information is then displayed on screen 36 for the selected cassette. At this point, the customer checks that this is the desired cassette and instructs the machine to continue by providing an appropriate instruction. In a manner set forth above, CPU 14 seeks authorization for such a transaction from either an internal record source, an external record source, or the network controller (which itself may have an internal record source or which is capable of accessing an external record source). If CPU 14 receives a credit rejection from such a record source, the patron is advised via screen 36 that it is unable to process the request, and CPU 14 inquires if another sequence (mode) of operation, i.e. rental or return, is desired. If no further operation is indicated, CPU 14 returns the credit car and ends the transaction. If credit authorization is received by CPU 14, the desired cassette is dispensed in a manner as set forth above and CPU 14 either updates its internal record source with respect to such transaction or conveys such information to remote record source or to the network system. When the customer removes the cassette from gate assembly 22 the optical sensors therein provide CPU 14 with an indication of such removal. Solenoid 218 is thereby activated to shift gate member 214 across opening 200, and drive motor 202 is deactivated. Upon completion of the transaction, the customer is provided with a receipt of the transaction from printer 21, and his/her credit card is returned.

Referring now to the operation of the "return mode", if the patron selects the return mode, screen 36 displays an image instructing the patron to place the cassette to be returned in the receptacle area, i.e. opening 200, of the gate assembly 22. At this time, CPU 14 instructs control unit 16 to move picker assembly 20 into registry with gate assembly 22. Likewise, with reference to FIG. 10, solenoid 218 is activated to shift gate member 214 away from opening 200 and drive motor 202 is activated in a direction which will draw case 30 (together with the cassette) through opening 200. Case 30 may then be inserted by the patron into gate assembly 22. Groove 242 on case 30 and shoulder 212 on gate housing 19 requires that case 30 be inserted into gate assembly 22 in a single orientation. The optical sensor within gate housing 190 indicates to CPU 14 when case 30 is inserted therein, whereupon conveyor motor 174 on picker assembly 20 is activated in a direction to draw case 30 from gate assembly 22 into article receiving opening 128 of picker assembly 20. Article code reader 154 (FIG. 8) positioned below plate 126 reads the article identification code on the cassette which appears through window 240 in case 30. This information is conveyed via control unit 16 to CPU 14. CPU 14 locates information maintained in file storage 17 regarding the rental of the identified cassette and calculates the rental charges thereon. The rental charges are displayed screen 36. At this time, the patron may be provided an option of purchasing the cassette or having the rental fee debited to his account. If the customer chooses to purchase the cassette, he may indicate such by pressing an appropriate operation key on panel 37. If this is done, the cassette is returned to the patron in a manner as described above with respect to the dispensing mode, and the customer's records or accounts are debited accordingly. If the customer chooses not to purchase the cassette, he may indicate such whereupon CPU 14 instructs control unit 16 to return the cassette to an empty bin location within arrays 42, 44. In this respect, CPU 14 is programmed to locate an empty bin number within arrays 42, 44, by scanning location/article table in file article memory storage 19 and locating the first empty bin in such table. In this respect, CPU 14 preferably locates returned articles to open bins located near gate assembly 22, thereby reducing the distance picker assembly 20 must move to dispense the cassettes. When the preferred bin number has been ascertained by CPU 14, it is conveyed to control unit 16 which utilizes translation table 220 to determine the location of the empty bin in the X-Y grid. Control unit 16 then activates motors 76, 100 to transfer picker assembly 120 to the appropriate bin. The cassette is then transferred in a manner as described above into the bin, and the article/location table is revised to indicate the article identification code number corresponding to the bin number. Upon completion of the transaction, solenoid 218 is deactivated to shift gate member 214 across opening 200. The customer is provided with a receipt and his/her credit card is returned.

In the event that the article code on the returned cassette cannot be ready by the above code reader 154 the first time, it tries again to read the code. After a predetermined number of attempts, the cassette in case 30 will be transferred to an empty bin location, and the article will be identified in the location/article code table with a serial number (article code) placing the cassette under a hold status. Screen 36 will advise the customer that the machine is unable to verify the cassette and advise the customer to contact the system operator to correct any problems with the cassette. Failure of bar code 154 to read the article code on the cassette may be due to the bar code having been removed from the cassette, insertion of an improper cassette, or simply due to the bar code having been obscured for some reason. In any event, cassettes returned to the machine within case 30 which cannot be identified by the machine are kept and stored in the machine, and problems caused thereby are to be handled personally by the system operator. In such situations, the customer is provided with a receipt by printer 21 providing information regarding the system operator and advising the customer to contact same.

Referring now to the operation of a network system 250, the individual machines in a network system operate in a manner as set forth above. In a network system however, information from one machine 10 can be conveyed to another machine 10 via system controller 252 (and regional controllers 254). In this respect, cassettes dispensed from one machine 10 may be returned to the same machine 10 or any other machine 10 in the network system 250. Because each cassette in the system has a unique article identification code, it can be monitored throughout the system. More specifically, of a cassette is returned to a machine 10 from which it was not dispensed, though the machine 10 will recognize the article code, information relating to the cassette's article code will not be located in the machine's memory storage 19. In such situations, the machine 10 will seek information about the cassette from regional controller 254 or from system controller 252. As set forth above, information regarding each transaction in each machine 10 my be transmitted immediately or periodically to controllers 252, 254 for storage therein for just such purpose. With such information (dispensing data), the machine to which the cassette was returned can complete computation of rental or purchase costs, and provide the customer with a receipt of the entire transaction. Information about the completed transaction is communicated via the network system to the machine dispensing the cassette to complete its records thereon.

In addition to allowing a customer to return a dispensed cassette to any machine 10 in the network system, a system according to the present invention permits the system operator to vary programmable features of the machines, individually, in groups, or all together by means of system controller 252. CPU 14 and regional controllers 254 are adapted to the programmable by system controller 252. Accordingly, programs within CPU 14, such as programs relating to the moving message display 31, the instructional lead-through for the customer's assistance, price structure, tax tables, etc., can be varied at one location (system controller 252) without the need of modifying each machine individually. In this respect, system controller provides a central location for controlling the programmable features of each machine 10. It will of course be appreciated, that region controller 254 may also have the capacity to control the same programmable features of the machines 10 connected thereto. The disclosed network system, 250 thus provides the system operator great flexibility and cost savings in the operation of the system.

With respect to the preferred embodiment of the present invention and the operation thereof, it is important to note that cassettes returned to the machine or system are quickly returned to the usable inventory thereof for further use. In this respect, there is no delay or necessity of manually restocking a machine to maintain the usable inventory. In addition, the "pass-through" configuration of picker assembly 22 enables such assembly to remove and replace cassettes from either side thereof, i.e. to either array 42 or 44. Such arrangement substantially increases the number of cassettes which can be stored in the video dispensing machine in that is provides for use with two generally parallel planar arrays. An additional feature of the present invention is that by providing the code reader on the picker assembly, the present machine can inventory itself by merely positioning the picker assembly in front of each bin, removing the article therefrom, reading the bar code thereon and returning the article to the bin. By consecutively reading the bar code on each article at each bin location within the location/article table, machine 10 can inventory itself.

The present invention has been described with reference to a preferred embodiment. Other modifications and alterations will occur to those skilled in the art upon reading and understanding of the specification. For example, the present invention has been described with reference to an electronic method of monitoring financial transactions. It will be appreciated, that the present invention may be adapted to accept tokens, cash or specialized cards to initiate dispensing. It is intended that all such modifications and alterations be included insofar as they come within the scope of the appended claims or equivalents thereof.

Having thus described the invention, the following is claimed:

1. An apparatus for dispensing and returning reusable articles, comprising:

means defining a pair of planar arrays, each having a plurality of locations for holding a reusable articles therein, each location identifiable with its own particular location code and each article identifiable with its own particular article code;

memory means adapted to store details of said location codes and said article codes;

input data means operatively connected to said memory means for receiving informational data from a patron;

receptacle means accessible to a patron for receiving articles;

transfer means operable for placing an article into a location in said arrays or removing an article therefrom, said transfer means including:

platform means disposed between said arrays and being movable along guides through a plane parallel to said arrays, platen means mounted on said platform means for reciprocal movement between said planar arrays along an axis perpendicular to said arrays, said platen means defining an article receiving opening therebetween and being movable between a first position wherein said platen means are in a central position on said platform means and second positions wherein said platen means are shifted to a side of said platform means toward a location in one of said arrays, and conveyor means for conveying an article into or out of said receiving opening when said platen means is in said second position, and being movable relative to said arrays between operative engagement with an article in any of said locations and said receptacle means;

article code sensing means adapted to sense the article code of an article carried by said transfer means; and, control means having means for receiving control information and for generating output instructional information and control signals, said control means being responsive to input data from said patron to initiate the transfer of a selected article from a location in said arrays to said access opening by said transfer means, or to return an article received by said patron from said access opening to an empty location in said arrays.

2. An apparatus as defined in claim 1 wherein said conveyor means is mounted on one of said platens.

3. An apparatus as defined in claim 2 wherein said conveyor means includes:

a reversible motor; and a flexible endless belt movable along a predetermined path extending through said receiving opening, said belt being adapted to engage said article.

4. An apparatus as defined in claim 1 wherein said transfer means further comprises means for sensing the position of an article within said receiving opening.

5. An apparatus as defined in claim 4 wherein said means for sensing includes optical limit switches on said platens.

6. An apparatus as defined in claim 1 wherein said arrays are parallel to each other and each array includes rows of bins arranged side-by-side, each bin in an array defining a location and having an open end lying in a common plane containing perpendicular X and Y directional axes.

7. An apparatus as defined in claim 6 wherein said transfer means if operable to move an article between said arrays through X, Y and Z directions, the Z direction extending along a Z directional axes transverse to said X and Y directional axes.

8. An apparatus as defined in claim 6 wherein said transfer means includes:

platform means movable through said X and Y directions; and platen means mounted on said platform means movable in said Z direction, said platen means defining an article receiving opening and including means for conveying articles in said arrays into and out of said receiving opening.

9. An apparatus as defined in claim 1 wherein said data means includes:

means for receiving identification information from a patron;

means for recording the time of vending and the time of return; and means for debiting or crediting a patron's financial account.

10. A device for transferring generally rectangular articles between a first location in a generally planar array and a second location remote from said array, said array having a plurality of locations arranged side-by-side for holding an article therein, said locations having open ends with corresponding forward portions lying in a common plane, said device comprising:

platform means movable in a second plane parallel to the common plane of said locations;

platform drive means for moving said platform means through said second plane;

two spaced platens mounted on said platform means defining an article receiving opening therebetween for holding an article to be transferred, said platens being adapted for reciprocal movement relative to said platform means along an axis perpendicular to said planar array between a first position wherein said holder means is in an article carrying position and a second position wherein said holder means is shifted toward said array;

drive means for moving said platens between said first and second positions;

belt conveyor means mounted on one of said platens for conveying an article into or out of said receiving opening when said platens is in said second position, said belt conveyor means operable to frictionally engage one side of said article;

belt conveyor drive means;

rail means disposed between said platens to bias said article into frictional engagement with said belt conveyor means;

sensing means on the other platen for sensing the presence and position of an article in said receiving opening; and, control means responsive to input information for controlling movement of said platform means, said holder means and said belt conveyor means.

11. A device as defined in claim 10 wherein:

said belt conveyor means is a flexible endless belt movable along a predetermined path, a portion of said path extending through said receiving opening.

12. An apparatus as defined in claim 11 wherein said endless belt surrounds one of said platens and said belt conveyor drive means is mounted to said one of said platens.

13. An apparatus as defined in claim 11 wherein said belt conveyor drive means is operable in response to signals from said sensing means.

14. An apparatus as defined in claim 11 wherein; said sensing means and said rail means is comprised of a movable rail extending between said two spaced platens, said rail being movable laterally when an article is conveyed into said receiving opening, and means for indicating when movement of said rail has occurred.

15. An apparatus as defined in claim 11 wherein said platens lie in vertical planes.

16. An apparatus for dispensing and returning reusable articles each identifiable with its own identification code, comprising:

housing means including a pair of parallel planar arrays, each array having rows of bins arranged side-by-side, the bins of each array having an open end with a forward portion lying in a common plane wherein the open ends of bins in one array face the open ends of corresponding bins in the other array, each bin being capable of holding a reusable article therein and each bin having its own particular location code;

receptacle means for receiving and dispensing said articles, data means for receiving informational data from a patron;

means utilizing said informational data to determine whether said patron has a dispensing authorization status;

memory means adapted to store details of said location codes, said article codes, and information regarding operations of said apparatus:

a computer unit having means for receiving control information and for generating output instructional information and control signals; and transfer means responsive to output instructional information and control signals from said computer unit for handling said articles, said transfer means being operable for withdrawing a selected article from a location and placing it in said receptacle means, or returning a previously dispensed article from said receptacle means to an empty location within said housing means, said transfer means including:

platform means disposed between said arrays and being movable along guides through a plane parallel to said arrays, a pair of spaced platens movable mounted on said platform means for reciprocal movement between said planar arrays along an axis perpendicular to said arrays, said platens, defining an article receiving an opening therebetween, said platens being movable between a first position wherein said platens are in a normal position on said platform means and a second position wherein said platens are shifted to one side of said platform means toward a location in one of said arrays, and conveyor means for conveying an article into or out of said receiving opening when said platens are in said second position.

17. An apparatus as defined in claim 16 wherein said common plane includes perpendicular X and Y directional axes, and wherein said transfer means includes a picker mechanism movable between said arrays through both of said X and Y directions.

18. An apparatus as defined in claim 17 wherein said picker mechanism is movable through a Z direction transverse to said X and Y axes toward said open ends of said bins in said arrays.

19. An apparatus as defined in claim 17 wherein said picker mechanism includes means for conveying articles from said bins into said picker mechanism and vice versa.

20. A video dispensing system for dispensing and returning reusable video cassette, each identifiable with its own cassette identification code, comprising:

a plurality of dispensing machines for dispensing and returning said reusable cassettes, each machine including:

a pair of planar arrays for storing a plurality of said reusable cassettes in locations identifiable by location identification codes;

means for sensing said cassette identification codes;

data means for receiving informational data from a patron;

transfer means operable to transfer a cassette from a location to a patron when such cassette is identified for rental by said patron and to return a cassette to a location upon return by said patron, said transfer means including:

platform means disposed between said arrays and being movable along guides through a plane parallel to said arrays, platen means mounted on said platform means for reciprocal movement between said planar arrays along an axis perpendicular to said arrays, said platen means defining an article receiving opening therebetween and being movable between a first position wherein said platen means are in a central position on said platform means and second positions wherein said platen means are shifted to a side of said platform means toward a location in one of said arrays; and, conveyor means for conveying an article into or out of said receiving opening when said platen means is in said second position;

memory means adapted to store details of said location codes, cassette codes, and machine operations in memory;

means for communicating data held in said memory means to a record source, external of said machine;

means for receiving data from said record source; and, a system controller connectable to said memory means of said machines, wherein said system controller including:

said record source means adapted to hold details of said location identification codes, cassette identification codes and operations of said dispensing machines;

means for receiving data from said memory means in said machines and storing it in said record source; and, means for conveying data from said record source to said machines, said system operable to rent a cassette from one machine and to accept return in other machined by conveying identification code information with respect to said cassette between the renting machine to the return machine via said system controller.

* * * * *